United States Patent Office 3,198,099
Patented Aug. 3, 1965

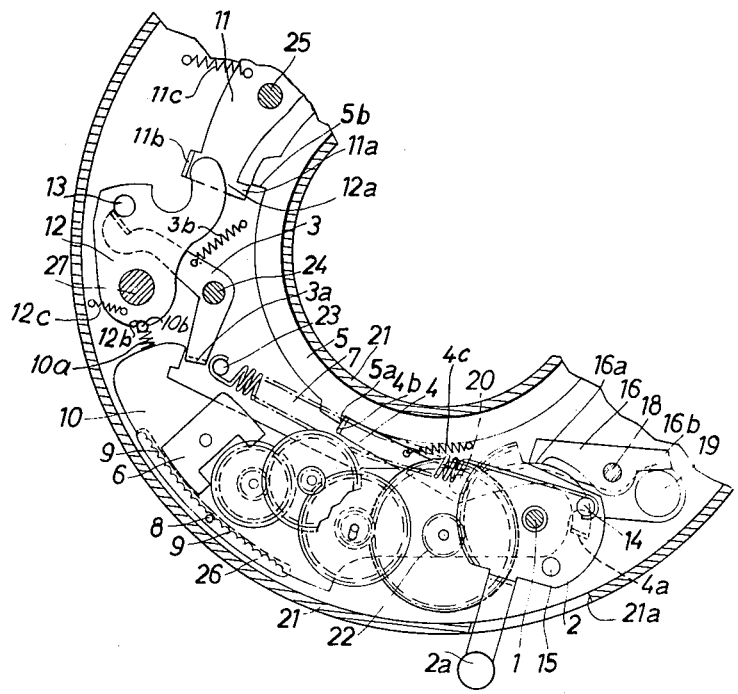

3,198,099
AUTOMATIC CAMERA WITH SELF-TIMER
Manfred Mueller, Donaueschingen, and Willi Schulz, Schwenningen, Germany, assignors to Agfa Aktiengesellschaft, Leverkusen, Germany
Filed Sept. 17, 1962, Ser. No. 224,050
Claims priority, application Germany, Sept. 16, 1961, A 17,226
6 Claims. (Cl. 95—53.3)

The present invention relates to cameras.

Most particularly, the present invention relates to cameras which have between-the-lens shutter, which are capable of being automatically set according to the lighting conditions and which are provided with a self-timer which, as is well known, will delay the tripping of the shutter for a given number of seconds enabling the operator, for example, to step in front of the camera so as to photograph himself.

In cameras of this type there is a considerable problem involved in providing an efficient compact assembly of the self-timer structure and the automatic camera setting structure. The known structures are exceedingly complex and require a large amount of space and are subject to frequent failures in operation in spite of the high cost of such structures. Undesirably powerful springs must be employed in order to provide the forces for actuating both the automatic structure and the self-timer structure. Attempts have been made to provide assemblies where when the camera is actuated to make an exposure the self-timer will run down before the automatic structure sets the camera and then the shutter is tripped. These structures are extremely difficult to accommodate in the space available in a camera having a between-the-lens shutter, and moreover they suffer from the disadvantage of preventing certain types of shutters from being used and preventing certain types of light measurements from being made when using the self-timer. For example, with such arrangements it is not possible to provide a proper light measurement for photographing a subject which contrasts sharply with its background.

It is accordingly a primary object of the invention to provide a camera having a between-the-lens shutter as well as a self-timer unit and a structure for automatically setting the camera while avoiding all of the above drawbacks.

Thus, the objects of the present invention include the provision of a camera of the above type which is relatively simple and inexpensive, which can accommodate the structure without difficulty in the space available with a between-the-lens shutter, and which will not necessitate the use of undesirably strong springs.

With the above objects in view the invention includes, in a camera which has a between-the-lens shutter and an automatic structure for automatically setting the camera, a shutter housing in which is located a movable means which moves when the camera is automatically set to positions determined by the automatic setting of the camera. A self-timer unit is movably mounted in the shutter housing for movement from a rest position into engagement with the movable means when the self-timer unit is cocked and the camera is operated to make an exposure, and the self-timer unit under these conditions by its engagement with the movable means will retain the automatic setting of the camera during the running down of the self-timer unit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which one possible embodiment of a structure according to the present invention is shown in the interior of a fragmentarily illustrated shutter housing.

Referring to the drawing it will be seen that the shutter housing 21 has an inner annular portion coaxially surrounding the optical axis and supporting for rotary movement a shutter-driving ring 5. For the sake of clarity, the shutter blades are not shown, but they are connected in a known way to a second shutter ring as well as to the ring 5 so that when the latter ring turns the blades will turn in order to open and close the shutter in a manner well known in the art.

Located within the housing 21 is a self-timer unit which includes a base plate 10 which carries all of the remaining elements of the self-timer unit, so that the self-timer unit forms a separate assembly which is self-sustaining and which can be assembled as a unit outside of the shutter housing and then mounted in the latter. The plate 10 of the self-timer unit is pivotally supported by a shaft 1 which is fixedly mounted on a wall of the shutter housing and extends parallel to the optical axis, this shaft 1 extending not only through the plate 10 to support the latter for turning movement in the shutter housing 21 but also through the rotary member 2 of the self-timer unit so that the shaft 1 also serves to guide the member 2 for rotary movement. This rotary member 2 is in the form of a lever which has a gear sector portion meshing with a pinion 22 of the gear train which is carried by the plate 10 and which ends in an escapement wheel cooperating with the escapement anchor 6 which is pivotally carried by the plate 10. The pinion 22 is fixed coaxially to a larger gear which meshes with a second pinion which is also fixed coaxially to a gear larger than this second pinion, and this latter gear and second pinion are formed with a slot through which extends a pin carried by the plate 10 and supporting the second pinion and gear fixed thereto for rotary as well as shifting movement, this arrangement being well known in the art and operating to permit cocking of the self-timer unit without transmitting a drive to the anchor 6. Thus, the arrangement is such that when the lever 2 is turned by the operator in a clockwise direction, as viewed in the drawing, during cocking of the self-timer unit, the gear connected to the pinion 22 will turn so as to shift the pinion which meshes therewith to a position where the gear connected to the pinion 22 can turn without turning the second pinion while when the pinion 22 and the gear connected thereto turn in a clockwise direction during running down of the self-timer unit the second pinion will be automatically shifted back to a position meshing with the gear connected to the pinion 22 and transmitting the drive to the escapement 6.

The self-timer unit is driven by a spring 7 one end of which is connected to a stationary pin 23 carried by the shutter housing and the other end of which is connected to a pin 14 fixedly carried by the level 2, so that when the lever 2 is turned in a clockwise direction, as viewed in the drawing, the spring 7 will be tensioned so as to cock the self-timer unit in preparation for operation thereof. When the self-timer unit is cocked the lever 4 will turn so that a lug 4b at one end thereof will move into engagement with a projection 5a of the shutter-drive ring 5, and the lever 4 is shown in this position in the drawing. The ring 5 will be incapable of turning to actuate the shutter blades to make an exposure until the end 4b of the lever 4 moves away from the projection 5a. This lever 4 is turnably supported by a pivot pin 20 which is carried by the plate 10, and at its end distant from the lug 4b the lever 4 has a lug 4a for a purpose described below. In the rest position of the self-timer unit, it is displaced about the pin 1 shown in the drawing in a clockwise direction from the position of the unit which is illustrated in the drawing, and in this latter rest position of the self-timer unit, the escapement anchor 6 engages the spring 7 so that by reason of this engagement the escapement anchor 6 cannot turn and thus the spring 7 also forms an element engaging the escapement anchor to prevent running down of the self-timer unit after the latter has been cocked. The lever 2 carries a projection which extends through a slot in the outer wall of the shutter housing 21 and which terminates in a handle 2a accessible to the operator for cocking the self-timer unit, and the left end of this slot, as viewed in the drawing, engages the projection of the lever 2 for terminating the turning of the latter during cocking of the self-timer unit, the latter being shown in its cocked condition in the drawing.

There is also located within the shutter housing 21 a stationary pin 25 extending parallel to the optical axis and supporting for turning movement a lever 11 having a projection 11a which engages a projection 5b of the shutter-drive ring 5 to prevent the latter from driving the shutter. When the self-timer unit is not cocked and does not enter into the operation of the camera the end 4b of the lever 4 is displaced from the projection 5a and the ring 5 will drive the shutter when the projection 11a moves away from the projection 5b. The lever 11 also has a lug 11b engaging an extension 12a of a lever 12 which forms a manually operable means capable of being turned by the operator to initiate the operations which will result in an exposure. The spring 7, when tensioned, seeks to turn the plate 10 in a counter clockwise direction about the pin 1 to the position illustrated in the drawing where the escapement anchor 6 will be displaced from the spring 7 so that the self-timer will start to run down and thus the spring 7 also forms a spring means urging the self-timer unit away from its rest position to the operating position thereof illustrated in the drawing. A release means, or a releasable holding means, is provided for releasably holding the self-timer unit in opposition to the spring 7 in its rest position after the self-timer unit has been cocked and this releasable holding means includes a lever 3 supported for turning movement by a stationary pin 24 carried by the shutter housing and having at one end a lug 3a which catches onto a projection shown at the upper left part of the plate 10 in the drawing so as to prevent the self-timer unit from being turned by the spring 7 to the position shown in the drawing At its end distant from the lug 3a, the lever 3 has a lug engaging a pin 13 carried by the manually operable lever 12 for turning movement with the latter. The lever 12 is fixed to a rotary shaft 27 supported for rotary movement by the shutter housing and having a portion extending to the exterior thereof and accessible to the operator who can turn the shaft 27 so as to turn the lever 12 of the manually operable means in a counter clockwise direction, as viewed in the drawing, with the result that the pin 13 will engage the lever 3 to turn the latter in a counter clockwise direction releasing the plate 10 so that the spring 7 can move the self-timer unit to the position illustrated in the drawing, and in addition to the extension 12a of the lever 12 by cooperation with the lug 11b will turn the lever 11 in a clockwise direction, as viewed in the drawing, so as to displace the lug 11a from the projection 5b, and the parts are shown where the projection 11a has just moved beyond the projection 5b When the self-timer is not cocked this opertaion would result in release of the ring 5 to drive the shutter and make the exposure but when the self-timer is cocked, as shown in the drawing, the lever 4 prevents turning of the ring 5 even when the latter is no longer held by the lug 11a.

The structure for automatically setting the camera according to the lighting conditions is conventional and is therefore not shown. This structure will operate in a known way, when the operator turns the shaft 27, so as to automatically set the diaphragm and/or exposure time. In connection with these operations, a ring 26 in the housing 21 will be turned, although instead of a ring 26 a lever may be provided, and thus the ring 26 will assume positions according to the automatic setting of the camera. This ring 26 fixedly carries a pin 8 which extends parallel to the optical axis and thus forms a movable element or means in the shutter housing the position of which is determined by the automatic setting of the camera, and an edge portion of the plate 10 which is directed toward the pin 8 is formed with a row of notches 9 one of which will receive the pin 8 when the spring 7 displaces the self-timer unit from its rest position to the position shown in the drawing, and because the pin 8 is held in one of the notches 9 during running down of the self-timer unit the automatic setting of the camera will be maintained as long as the plate 10 remains in the position shown in the drawing, so that the structure of the invention includes a means which prevents a change in the automatic setting of the camera during the running down of the self-timer unit.

Assuming that the self-timer unit has been cocked as described above and that the operator then turns the shaft 27 so as to initiate the operations for making an exposure, the shaft 27 and lever 12 turning on a counter clockwise direction toward the position shown in the drawing at this time, then in a manner well known in the art the automatic structure is released during the initial part of the turning of the manually operable means 12, 27 to automatically set the camera and thus also determine the position of the movable means 8, 26, as described above. Then, the continued turning of the manually operable means will cause the pin 13 to engage the lever 3 and turn the latter away from the plate 10 so that the spring 7 will displace the self-timer unit to the illustrated position where the pin 8 is in one of the notches 9. Thus the automatic setting of the camera will be retained until the shutter has made the exposure. Of course, the movement of the self-timer unit to the position shown in the drawing displaces the escapement anchor 6 from the spring 7 so that the running down of the cocked self-timer unit commences simultaneously with the movement thereof to the operating position shown in the drawing. The spring 7 will of course turn the lever 2 in a counterclockwise direction, as viewed in the drawing, during running down of the self-timer unit. Immediately after release of the self-timer unit by the release means 3 the manually operable means 12, 27 displaces the lug 11a away from the projection 5b but the ring 5 is still prevented from driving the shutter by the lever 4, as described above.

As the self-timer unit approaches the end of its running down movement the projection of the lever 2 will approach the end 21a of the slot through which this projection extends, and the pin 15 which is carried by the lever 2 for turning movement therewith will engage the end 4a of the lever 4 so as to turn the lever 4 and displace the end 4b thereof away from the projection 5a, and thus at the end of the running down of the self-timer the shutter-drive ring 5 is released for driving the shutter and making the exposure in a manner well known in the art.

There is also located within the shutter housing a means for returning the self-timer, after it has run down, to its rest position, and this structure takes the form of a lever means formed by the lever 16 which is supported for turning movement by a stationary pin 18 carried by the shutter housing and which has an end portion 16b cooperating with a pin 19 carried by the plate 10 at its end distant from the lever 3. Before the extension of the lever 2 engages the end 21a of the slot in the outer wall of the shutter housing, immediately after the lever 4 has been turned by the pin 15 to release the ring 5, the pin 14 is driven by the spring 7 into engagement with the end 16a of the lever 16 to turn the latter in a clockwise direction so that its end 16b will move the pin 19 and the plate 10 in a clockwise direction about the pin 1 in order to return the self-timer unit to its rest position and during this return movement of the self-timer unit the lever 3 again catches the projection at the left end of the plate 10 to retain the unit in its rest position when it is again cocked. Moreover the anchor 6 again moves into engagement with the spring 7, and the lever 2 engages the end 21a of the slot of the shutter housing.

The lever 4 is urged by a spring 4c in a clockwise direction about the pivot 20, as viewed in the drawing, so that when the lever 2 is turned in a clockwise direction to cock the self-timer mechanism, the pin 15 by moving away from the lug 4a will release the lever 4 to the spring 4c which will turn the lever 4 so as to place the lug 4b in front of the projection 5a. The spring 3b acts on the lever 3 to urge it in a clockwise direction, and the pin 13 turns the lever 3 in opposition to the spring 3b when the lever 12 is turned by the operator in a counter-clockwise direction, as viewed in the drawing. A spring 11c urges the lever 11 to turn in a counter-clockwise direction about the pin 25 so that the extension 12a engages the lug 11b to turn the lever 11 in opposition to the spring 11c, and also the operator turns the lever 12 in opposition to a spring 12c which seeks to turn the lever 12 to its rest position. The lever 12 is formed with a notch 12b which receives a spring-pressed ball 10b urged outwardly away from the plate 10 by spring 10a pressing against the plate 10, as shown diagrammatically in the drawing, so that when the spring 7 turns the plate 10 to its operating position shown in the drawing, the ball 10b will snap into the notch 12b to retain the levers 12 and 11 in opposition to the springs 12c and 11c in the illustrated position during running down of the self-timer. When the lever 16 turns in a clockwise direction to act on the pin 19 for returning the plate 10 to its rest position, the ball 10b is displaced from the recess 12b and the spring 12c can now return the lever 12 to its starting position, and of course the spring 3b will turn the lever 3 so as to catch the plate 10, and moreover spring 11c will be capable of turning the lever 11 to cause its notch 11a to become located in front of the projection 5b when the ring 5 is turned back to the illustrated position in order to cock the shutter.

Of course the invention is not limited to the particular details shown in the drawing and described above. For example, while it is preferred to use the spring 7 for the function of preventing movement of the anchor 6 when the self-timer is cocked, nevertheless it is possible to provide a special stop for this purpose, and any known structure may be used for preventing transmission of the drive to the anchor during cocking of the self-timer unit. Moreover, the lugs 11a and 4b, instead of cooperating directly with the shutter-drive ring 5 can cooperate with any other element which moves during operation of the shutter so as to prevent running down thereof in the manner described above. Moreover, while it is preferred to make full use of the spring 7 for driving the self-timer unit, for preventing movement of the anchor, and for displacing the unit to its operating position shown in the drawing, it is also possible to shift the self-timer unit from its rest position to the operating position shown in the drawing by use of a structure such as a suitable lever transmission which will move the self-timer unit in this manner in response to turning of the lever 12.

It will be understood that each of the elements described above, or two or more together, may also find a useful application in other types of cameras differing from the types described above.

While the invention has been illustrated and described as embodied in automatic cameras with self-timers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed as new and desired to be secured by Letters Patent is:

1. In a camera having a between-the-lens shutter and an automatic structure for automatically setting the camera according to the lighting conditions, in combination, a shutter housing; a self-timer unit pivotally carried by said housing in the interior thereof and adapted to be cocked by the operator whenever it is desired to use the self-timer unit, said unit including a plate formed along one edge with a row of notches; a pin located in said housing; means forming part of said automatic structure and moving said pin during automatic setting of the camera to a position determined by the automatic setting of the camera; spring means operatively connected to said unit for urging the latter, when cocked, to turn from a given rest position to a position where said pin is received in one of said notches, said spring means forming also a drive spring for said self-timer unit; manually operable means connected to said housing for initiating operations which result in tripping of the camera shutter and making of an exposure; and release means actuated by said manually operable means and operatively connected to said unit for releasing the latter to be moved by said spring means from said rest position to said position where said pin is received in one of said notches when said manually operable means is manipulated to make an exposure, whereby the automatic setting of the camera will be maintained during running down of said self-timer unit by cooperation of said unit with said pin.

2. In a camera having a between-the-lens shutter and an automatic structure for automatically setting the camera according to the lighting conditions, in combination, a shutter housing; movable means in said shutter housing movable to positions determined by the automatic setting of the camera; a self-timer unit movably carried by said housing in the interior thereof for moving toward and away from said movable means, said self-timer unit including an escapement anchor which engages an element in said shutter housing to prevent movement of said escapement anchor and thus prevent running down of the cocked self-timer unit, said anchor moving out of engagement with said element when said unit moves into engagement with said movable means so as to initiate the running down of said self-timer unit simultaneously with movement thereof into engagement with said movable means; manually operable means connected to said housing for initiating operations which will result in an exposure; and means actuated by said manuallly operable means, when the latter is manipulated by the operator, and moving said self-timer unit when cocked into engagement with said movable means to prevent movement of the latter after the camera has been automatically set during the running down period of said self-timer unit, whereby the automatic setting of the camera is maintained during running down of said unit.

3. In a camera having a between-the-lens shutter and an automatic structure for automatically setting the camera according to the lighting conditions, in combination, a shutter housing; a self-timer unit pivotally carried by said housing in the interior thereof and adapted to be cocked by the operator whenever it is desired to use the self-timer unit, said unit including a plate formed along one edge with a row of notches; a pin located in said housing; means forming part of said automatic structure and moving said pin during automatic setting of the camera to a position determined by the automatic setting of the camera; spring means operatively connected to said unit for urging the latter, when cocked, to turn from a given rest position to a position where said pin is received in one of said notches, said spring means forming also a drive spring for said self-timer unit and said unit including an escapement anchor engaging said spring means in the rest position of said unit to prevent running down of the cocked unit; manually operable means connected to said housing for initiating operations which result in tripping of the camera shutter and making of an exposure; and release means actuated by said manually operable means and operatively connected to said unit for releasing the latter to be moved by said spring means from said rest position to said position where said pin is received in one of said notches when said manually operable means is manipulated to make an exposure, whereby the automatic setting of the camera will be maintained during running down of said self-timer unit by cooperation of said unit with said pin, said escapement anchor moving away from said spring means to initiate the running down of said self-timer unit when the latter is released by said release means.

4. In a camera having a between-the-lens shutter and an automatic structure for automatically setting the camera according to the lighting conditions, in combination, a shutter housing; movable means in said shutter housing movable to positions determined by the automatic setting of the camera; a self-timer unit movably carried by said housing in the interior thereof for moving toward and away from said movable means; manually operable means connected to said housing for initiating operations which will result in an exposure; means actuated by said manually operable means, when the latter is manipulated by the operator, and moving said self-timer unit when cocked into engagement with said movable means to prevent movement of the latter after the camera has been automatically set during the running down period of said self-timer unit, whereby the automatic setting of the camera is maintained during running down of said unit; and moving means located in said housing and actuated by a moving part of said unit near the end of the running down thereof for moving said unit away from said movable means at the end of the running down of said unit.

5. In a camera having a between-the-lens shutter and an automatic structure for automatically setting the camera according to the lighting conditions, in combination, an annular shutter housing surrounding the optical axis of the objective of the camera; means in said housing movable around said axis during automatic setting of the camera to assume a position determined by the automatic setting thereof; a pin carried by said latter means and extending substantially parallel to the optical axis; a self-timer unit located in said housing and including a base plate which carries the other elements of said unit, said plate being pivotally supported in said housing and having an elongated edge portion directed toward said pin and formed with a row of notches one of which will receive said pin when said unit is turned toward said pin; releasable holding means in said housing releasably holding said unit in a rest position displaced from said pin; spring means urging said unit, when cocked, toward said pin; manually operable means manipulated to initiate the operations for making an exposure and cooperating with said releasable holding means for actuating the latter to release said unit after the camera has been automatically set and said unit has been cocked, so that said spring means will then move said unit to a position where said pin will be received in one of said notches to prevent a change in the setting of the camera during the running down of said self-timer unit; and lever means in said housing engaging part of said unit, said unit including a rotary member which near the end of the running down of said unit engages and turns said lever means for actuating the latter to move said unit away from said pin.

6. In a camera as recited in claim 5, said spring means forming also a drive spring for driving said unit and said spring means in addition being connected to said rotary member which turns said lever means.

References Cited by the Examiner

UNITED STATES PATENTS 3,007,387 11/61 Rentschler _____ 95—53.3

JOHN M. HORAN, *Primary Examiner.*

NORTON ANSHER, *Examiner.*